| United States Patent [19] | [11] Patent Number: 4,987,213 |
|---|---|
| Hirose et al. | [45] Date of Patent: Jan. 22, 1991 |

[54] POLYURETHANE AND PROCESS FOR PREPARING SAME

[75] Inventors: Shigeo Hirose, Matsudo; Shoichiro Yano, Tsukuba; Kyoe Hatakeyama, Inashiki; Kunio Nakamura, Kawasaki, all of Japan

[73] Assignee: Director-General of Agency of Industrial Science and Technology, Japan

[21] Appl. No.: 323,996

[22] Filed: Mar. 16, 1989

[30] Foreign Application Priority Data

May 16, 1988 [JP] Japan .............................. 63-120170

[51] Int. Cl.$^5$ .................... C08G 18/00; C08G 59/00
[52] U.S. Cl. .................................. 527/301; 527/401; 521/159; 521/160; 521/161; 521/162
[58] Field of Search ............. 527/301, 401; 521/159, 521/160, 161, 162

[56] References Cited

U.S. PATENT DOCUMENTS

| 3,519,581 | 7/1970 | Moorer et al. | 527/401 |
|---|---|---|---|
| 4,032,483 | 6/1977 | Hartman | 527/301 |
| 4,855,184 | 8/1989 | Klun et al. | 527/301 |
| 4,861,629 | 8/1989 | Nahm | 527/301 |

OTHER PUBLICATIONS

Lignins: Properties and Materials, Chapter 24, "Organosolv Lignin-Modified Phenolic Resins", 1989, American Chemical Society, pp. 324-328.
Proceedings of the International Symposium on Wood Pulping Chemistry, "The Ekman Days", vol. 3, Stockholm, Jun. 9-12, 1981.
Fengel et al., Wood Chemistry, Ultrastructure, Reactions; Walter de Gruyter, Berlin, 1984.

Primary Examiner—Nathan M. Nutter
Attorney, Agent, or Firm—Lorusso & Loud

[57] ABSTRACT

A new polyurethane as well as a process for preparing same is disclosed. The new polyurethane contains therein a hard segment derived from at least one polyhydroxy substance selected from the group consisting of cellulosic substances, hemi-cellulosic substances and lignic substances, and is excellent in mechanical and thermal characteristics as compared with the existing polyurethanes. The new polyurethane can be prepared according to a method known per se, using the polyhydroxy substance alone or in mixture with a polyol compound as reactants to be polycondensed with a polyisocyanate.

14 Claims, No Drawings

POLYURETHANE AND PROCESS FOR PREPARING SAME

BACKGROUND OF THE INVENTION

1. Field of the Invention

The present invention relates to a new polyurethane and a process for preparing same. More particularly, the present invention relates to a new polyurethane containing therein a hard segment derived from at least one specific polyhydroxy substance selected from cellulosic substances, hemi-cellulosic substances and lignic substances as well as a process for preparing the polyurethane according to a method known per se wherein at least one of the above specific polyhydroxy substance is used as a part or whole of a polyhydroxy ingredient to be reacted with a polyisocyanate ingredient.

2. Description of the Prior Art

From the past, various kinds of polyurethanes derived from various polyhydroxy ingredients and various polyisocyanates are known in the field of resins and plastics. In the production of polyurethanes, the polyhydroxy reactant to be polycondensed with a polyisocyanate reactant is generally a polyol compound or a sugar which is called a soft segment component capable of forming a soft segment by the reaction with a polyisocyanate. Up to the present, however, no polyurethanes derived from lignocelluose as a hard segment component have been known in this art. In general, cellulosic substances including cellulose itself and derivatives thereof having unreacted hydroxyl groups are polymeric polyhydroxy compounds, i.e. polyhydroxy compounds having macromolecular polymer skeletons, and behave differently from monomeric polyhydroxy compounds such as saccharides. Among the cellulosic substances broadly termed, lignocellulose is contained not only in pulp as a main product in pulp industry but also in various kinds of by-products, agricultural waste materials, etc. and is now watched as a substance effective utilization of which is strongly desired.

On the other hand, chemical modifications in various resinous materials including polyurethane are continuously studied in this art to improve their useful properties.

Under the above mentioned circumstances, there is a great demand in the field of agricultural industry including pulp industry to find effective utilization of lignocellulose as chemical starting material and thereby developing a new art for improving the quality of various synthetic materials.

BRIEF SUMMARY OF THE INVENTION

Accordingly, it is an object of the present invention to provide a new polyurethane containing therein a hard segment derived from lignocellulose.

It is another object of the present invention to provide a new polyurethane possessing excellent mechanical and thermal characteristics as compared with the existing polyurethanes.

It is still another object of the present invention to provide a process for preparing a new polyurethane which comprises reacting such a cellulosic substance alone or together with a polyol compound is a polycondensation reaction with a polyisocyanate.

It is a further object of the present invention to utilize such a cellulosic substance effectively as a chemical raw material for producing synthetic materials.

Other objects, features and advantages of the present invention will become apparent more fully from the following description.

DETAILED DESCRIPTION OF THE INVENTION

The present inventors have made extensive research on effective utilization of lignocellulose as a chemical starting material for producing synthetic materials. As a result of the research it has now been found that lignocellulose has an excellent effect as a hard segment component for producing polyurethane and that the polyurethane thus obtained which contains therein a hard segment derived from the hard segment component is remarkably superior in mechanical and thermal characteristics to the existing polyurethanes usually derived from a polyol compound and a polyisocyanate.

In accordance with the present invention, there is provided a new polyurethane which has been prepared from at least one polyhydroxy ingredient and at least one polyisocyanate ingredient, characterized by containing therein a hard segment derived from at least one polyhydroxy substance as a hard segment component selected from the group consisting of cellulose, hemi-cellulose and lignin.

In accordance with the present invention, there is also provided a process for the preparation of a new polyurethane, which comprises bringing at least one polyhydroxy ingredient to a polycondensation reaction with at least one polyisocyanate ingredient in the presence or absence of water, characterized in that the polyhydroxy ingredient is a polyhydroxy substance as a hard segment component selected from the group consisting of cellulose, hemi-cellulose and lignin.

The polyhydroxy substance used in the present invention as a hard segment component is selected from cellulose, hemicellulose and lignin. Any of these substances can be used so far as they are soluble in a solvent. A mixture of these substances, for example, a composite cellulose such as lignocellulose, pectocellulose and the like can also be used in the present invention and is involved in the scope of the specified polyhydroxy substance.

It is important that substantially all the hydroxyl groups of the cellulose, hemicellulose and lignin should remain unmodified, since otherwise the polycondensation reaction with a polyisocyanate cannot generally proceed in a satisfactory manner. Thus, the use of, for example, acetylcellulose, methyl cellulose or the like modified cellulose or modified lignin is not suited for the purpose of the present invention. Further, no merits are feasible by the use of such modified materials and, rather, modification causes considerable increase of costs.

Preferable examples of the polyhydroxy substance used in the present invention include lignocellulose and its derivatives, such as industrial lignin like kraft lignin, solvolysis lignin, explosion lignin, hydrolyzed lignin with a mineral acid, etc., wood dust, various kinds of pulp and their residues, bagasse, coconut shell, coffee bean parchment and the like plant tissues. If necessary, such lignocellulose can be extracted from wood by treating it, for example, with cresol-water under heating.

The polyhydroxy substance can be used singly or as a mixture of at least two for polycondensation with the polyisocyanate ingredient. By the word "poly" used with respect to the polyhydroxy substance and the polyisocyanate ingredient is meant herein a number of two or more. Accordingly, the polyisocyanate may be a diisocyanate.

The polyisocyanate ingredients to be reacted with the polyhydroxy substance in this invention are widely know in the production of polyurethane and are commercially available. Any of the known polyisocyanates such as those of aromatic series, aliphatic series and heterocyclic series can be used in the present invention. Illustrative of the polyisocyanate are, for example, 4,4'-diphenylmethane diisocyanate (MDI), tolylene diisocyanate, phenylene diisocyanate and hexamethylene diisocyanate. These polyisocyanates are normally used singly, but may be used as a mixture of at least two. In the present invention, a polyol compound as a soft segment component capable of forming, after the reaction with the polyisocyanate ingredient, a soft segment may be omitted but is usually employed together with the polyhydroxy substance. In case the polyol compound is used jointly with the polyhydroxy substance, the polyol compound may be used in excess. In this case, excess polyol compound serves as a solvent for the polyhydroxy substance. The polyol compounds per se are widely known as reactants for the production of polyurethanes or polyesters and commercially available. The polyol compounds are roughly classified into those of polyether type and those of polyester type and any of these can be used in the present invention. Preferable examples of the polyol compound include polyethylene glycol, polypropylene glycol, polyethylene adipate, and polyethylene terephthalate.

The polyurethane of this invention can be prepared according to a method known per se for the production of polyurethane by polycondensation. Any of the conventional catalyst known for the production of polyurethane, such as those of amine type and those of tin type can be used for accelerate the polycondensation reaaction. The use of a catalyst of tin type such as dimethyltin laurate is preferable.

In accordance with the process of this invention, the polyhydroxy substance is dissolved, if necessary, together with the polyol compound in a solvent. Examples of the solvent in this case include tetrahydrofuran, dimethylsulfoxide, dioxane and the like conventional solvent inert to the reaction. In case the polyol compound is used together with the polyhydroxy substance, the polyol compound can be used in excess, as described hereinbefore, whereby the polyol compound has a dual function as the polyhydroxy reactant and as a solvent for the polyhydroxy substance. The solution is then mixed under heating with the polyisocyanate ingredient to effect a polycondensation reaction of the reactants normally in the presence of the catalyst.

In one embodiment of the process of this invention, water is allowed to exist in the polycondensation reaction system whereby the polyisocyanate is decomposed to form a polyurethane of foamy type. In this case, a conventional foam-controlling agent of silicone series may be added to the reaction system so as to obtain a uniformly foamed product.

In another embodiment of the process of this invention, water is not allowed to exist in the reaction system whereby the product is obtained in the form of a solid resinous substance.

The proportion of the polyol compound to the polyhydroxy substance is 0–50, preferably 0–30 in terms of part by weight, or in other words, the polyol compound is used in an amount of 0–5000, preferably 0–3000 parts by weight per 100 parts by weight of the polyhydroxy substance. When the polyhydroxy substance and the polyol compound are dissolved in the solvent such as tetrahydrofuran, the proportion of the polyol compound to the polyhydroxy substance is 0–0.95, preferably 0–0.9 in terms of part by weight, or in other words, the polyol compound is used in an amount of 0–95, preferably 0–90 parts by weight per 100 parts by weight of the polyhydroxy substance. The proportion of the diisocyanate ingredient to the polyhydroxy ingredient (the polyhydroxy substance alone or in mixture with the polyol compound) is 0.1–10, preferably 0.1–9 in terms of part by weight, or in other words, the polyisocyanate ingredient is used in an amount of 10–1000, preferably 10–900 parts by weight per 100 parts by weight of the polyhydroxy ingredient. In order to obtain the foamy product, the proportion of water to both of the polyhydroxy ingredient and the polyisocyanate ingredient is 0.001–0.2, preferably 0.005–0.1 in terms of part by weight, or in other words, water is used in an amount of 0.1–20, preferably 0.5–10 parts by weight per 100 parts by weight of both of the polyhydroxy ingredient and the polyisocyanate ingredient. The foam-controlling agent is used in an amount of 0.001–0.5, preferably 0.02–0.25 parts by weight per 100 parts by weight of both of the polyhydroxy ingredient and the polyisocyanate ingredient.

In case the polyol compound is used in excess as a solvent for the polyhydroxy substance in the process of this invention, a polyurethane derived from 5–90, preferably 10–70% by weight of the polyhydroxy substance, 5–90, preferably 10–70% by weight of the polyol compound, 5–90, preferably 10–70% by weight of the polyisocyanate ingredient can be obtained. In case a solvent other than the polyol comopund is used, a polyurethane derived from 5–90, preferably 10–70% by weight of the polyhydroxy substance, 0–90, preferably 10–70% by weight of the polyol compound and 0–90, preferably 10–70% by weight of the polyisocyanate ingredient can be obtained. It is generally preferable that the ratio by weight of the polyol compound to the polyhydroxy substance is set within the range of 0–20, preferably 0–10.

The polyurethane of this invention containing a hard segment derived from at least one polyhydroxy substance selected from cellulosic substances, hemi-cellulosic substances and lignic substancesis excellent in mechanical and thermal characteristics and is very economical in cost. In the polyurethane of this invention, its properties can easily be modified by allowing a soft segment derived from a polyol compound to exist together with the hard segment and varying the proportion of the hard segment to the soft segment.

The new polyurethane may be incorporated with a conventional auxiliary substance such as anti-oxidant, UV-protecting agent or a colorant thereby improving weather-resisting property and appearance. The polyurethane of this invention can be used in the form of a foamy substance or a solid resinous substance in various fields of industry where the existing polyurethane are used.

The present invention will now be illustrated in more detail by way of examples.

EXAMPLE 1

Beech wood was digested for 5 hours at 180° C. in a mixed solvent of cresol-water (mixing ratio by volume: 8:2), and solvolysis lignin was separated from the resultant cresol layer and purified. In tetrahydrofuran was dissolved with stirring the solvolysis lignin obtained as above to prepare its solution in tetrahydrofuran having a concentration of about 5% by weight. 4,4'-diphenylmethane diisocyanate (referred to hereinafter simply as DMT) was then added in an amount as shown in Table 1 to the above solution and a polycondensation reaction was carried out for 1 hour at 60° C. Polyethylene glycol 400 (molecular weight: 400) was then added in an amount as shown in Table 1, and the poly condensation reaction was continued for 1 hour at 60° C. The reactionsolution was concentrated under reduced pressure with the aid of a rotary evaporator, the concentrated liquid thus obtained was spread on a glass plate. A film of the polycondensate (polyurethane) was obtained after evaporation of the solvent. The film was then cured by heating it for 5 hours at 100° C.

The solvolysis lignin used in this experiment had the following physical properties:

(1) average molecular weight: $1.8 \times 10^3$
(2) hydroxyl group equivalent: 7.0 meq/g The molecular weight of the polyurethane in the reaction solution obtained above and physical properties of the thermally cured film are shown in Table 1. The abbreviations used in Table 1 have the following meanings:

SL: solvolysis lignin
PO: polyethylene glycol
MDI: 4,4'-diphenylmethane diisocyanate
NCO/OH: equivalent ratio of the isocyanate group to the hydroxyl group in the starting materials.

TABLE 1

| Sample No. | Composition of reactants (wt. %) | | | NCO/OH (equivalent ratio) | Physical properties of of the cured product | | | | Young's modulus (MPa) |
|---|---|---|---|---|---|---|---|---|---|
| | SL | PO | MDI | | Stress (MPa) | Strain (%) | Tensile energy (J/m$^3$) | | |
| | | | | | | | TEA | TEB | |
| 1 | 0 | 57.1 | 42.9 | 1.2 | — | 0.7 | — | 91.4 | — | $0.4 \times 10^6$ | 1.2 |
| 2 | 10 | 45.4 | 44.6 | 1.2 | — | 15.4 | — | 180.4 | — | $11.4 \times 10^6$ | 45.9 |
| 3 | 20 | 33.7 | 46.3 | 1.2 | 34.9 | 28.7 | 6.5 | 27.2 | $1.4 \times 10^6$ | $7.0 \times 10^6$ | 1142 |
| 4 | 30 | 22.0 | 48.0 | 1.2 | 48.4 | 43.2 | 6.7 | 11.8 | $1.9 \times 10^6$ | $4.1 \times 10^6$ | 1335 |
| 5 | 40 | 10.5 | 49.5 | 1.2 | 62.0 | 60.1 | 8.7 | 11.5 | $3.6 \times 10^6$ | $4.9 \times 10^6$ | 1644 |
| 6 | 48.8 | 0 | 50.2 | 1.2 | 62.9 | 62.5 | 8.3 | 8.5 | $3.7 \times 10^6$ | $3.9 \times 10^6$ | 1840 |

EXAMPLE 2

A methanol-soluble portion of industrial kraft lignin was dissolved in Polyethylene glycol 400. To this solution were added 0.7 g of a mixture of a foam-controlling agent of silicone series and water (1:1) and 5 drops of dimethyltin laurate, and the mixture was well stirred. To this mixture was added crude MDI, and the mixture was vigorously stirred. At the time of foaming being commensed, however, the stirring of the mixture was stopped. After the foaming proceeded completely, the foamed product was allowed to stand overnight. The polyurethane foam thus obtained was subjected to a compression test a result of which is shown in Table 2.

In Table 2, the unit of compression elasticity (E/ρ) is shown in terms of $10^2$MPa·m$^2$/kg, and the amount of the lignin (% by weight) added is based on the total weight of Polyethylene glycol 400 and the lignin.

TABLE 2

| Exp. No. | Amount of lignin (% by weight) | Compression elasticity (E/ρ) |
|---|---|---|
| 1 | 10 | 1.8 |
| 2 | 20 | 3.4 |
| 3 | 30 | 8.0 |

TABLE 2-continued

| Exp. No. | Amount of lignin (% by weight) | Compression elasticity (E/ρ) |
|---|---|---|
| 4 | 40 | 9.5 |

EXAMPLE 3

In 13.5 g of Polyethylene glycol 400 was dissolved at 60° C. 1.5 g of solvolysis lignin obtained by digestion (solvolysis) of beech wood in cresol-water system, and the solution was cooled to room temperature. The solution was treated in the same manner as described in Example 2 to obtain a polyurethane foam. The amount of crude MDI used for this treatment was 15 g. The resultant polyurethane foam had a compression elasticity (E/ρ) of 10.6.

EXAMPLE 4

One part of a thermomechanical pulp residue from pine wood was mixed under heating (250° C.) with 2 parts of Polyethylene glycol 400 to form a solution. To 3 g of this solution were added 6 g of Polyethylene glycol 400 and then 20 g of crude MDI, and the mixture was treated in the same manner as described in Example 2 to obtain a polyurethane foam. This foam had a compression elasticity (E/ρ) of 7.9.

EXAMPLE 5

One part of coffee bean parchment was mixed under heating with 2 parts of Polyethylene glycol 400 in the same manner as in Example 4 to obtain a solution. To 3 g of this solution was added 6 g of Polyethylene glycol 400, and the mixture was treated in the same manner as described in Example 2 to obtain a polyurethane foam, which had a compression elasticity (E/ρ) of 9.5.

EXAMPLE 6

To a solution obtained by mixing 1 g of solvolysis lignin with 4 g of Polyethylene glycol 400 was added under agitation at room temperature 4.5 g of crude MDI, and the mixture was reacted together for 1 hour to effect polycondensation of the reactants. The resultant product was processed to have a filmy form and thermally cured for 2 hours under the condition of a pressure of 50 kg/cm$^2$ at 120° C. The resultant cured film had a tensile elasticity of 60.0 MPa.

EXAMPLE 7

One part of coffee bean parchment and 2 parts of Polyethylene glycol 400 were mixed under heating to prepare a solution. To 3 g of this solution was added 6 g of Polyethylene glycol 400, and the resultant mixture was incorporated at room temperature with 5 drops of dimethyltin laurate and then with 20 g of crude MDI to effect polycondensation reaction whereby a polyurethane in the form of a solid mass was obtained, which had a tensile elesticity of 30 MPa.

EXAMPLE 8

One part of wood meal of pine was mixed with 1 part of Polyethylene glycol 400 to form a solution. To 1.5 g of this solution was added 6 g of Polyethylene glycol 400, and the mixture was treated in the same manner as described in Example 2 to obtain a polyurethane foam having a compression elasticity of 2.4 MPa.

It is understood that the preceding representative examples may be varied within the scope of the present specification, both as to the reactants and conditions, by those skilled in the art to achieve essentially the same results.

As may apparently widely different embodiments of the present invention may be made without departing from the spirit and scope thereof, it is to be construed that the present invention is not limited to the specific embodiments thereof except as defined in the appended claims.

What is claimed is:

1. A polyurethane which is the reaction product of an admixture consisting essentially of a polyisocyanate and a solvent solution of a polyhydroxy compound selected from the group consisting of lignocellulose having substantially all its hydroxyl groups unmodified, organosolv lignin and explosion lignin.

2. A polyurethane according to claim 1, which is in the form of a foam.

3. A new polyurethane according to claim 1, which is in the form of a film or a solid mass.

4. A polyurethane in accordance with claim 1 wherein said solvent is inert to reaction with said polyisocyanate.

5. A polyurethane in accordance with claim 1 wherein said organosolv lignin is obtained by cresol extraction of wood.

6. A polyurethane in accordance with claim 1 wherein said polyhydroxy compound is said lignocellulose.

7. A process for preparing a polyurethane comprising:
   preparing a solvent solution consisting essentially of a polyhydroxy compound selected from the group consisting of lignocellulose having substantially all its hydroxyl groups unmodified, organosolv lignin and explosion lignin by dissolving said polyhydroxy compound in a solvent inert to reaction with a polyisocyanate; and
   reacting said polyhydroxy compound in solution with a polyisocyanate.

8. A process according to claim 7, wherein the proportion of the polyisocyanate to the polyhydroxy compound is 0.1–10 parts by weight.

9. A process in accordance with claim 7 wherein said reaction is conducted in the presence of 0.001–0.2 parts per weight water per hundred parts by weight of the total of said polyisocyanate and polyhydroxy compound.

10. A process according to claim 9, wherein a foam-controlling agent is used together with the water.

11. A process according to claim 10, wherein the proportion of the foam-controlling agent to both of the polyhydroxy ingredient and the polyisocyanate ingredient is 0.00001–0.005 in terms of part by weight.

12. A process in accordance with claim 10 wherein said foam-controlling agent in used in the amount of 0.00001–0.005 parts by weight per hundred parts by weight of the total of said polyisocyanate in said polyhydroxy compound.

13. A process in accordance with claim 7 wherein said organosolv lignin is obtained by cresol extraction of wood.

14. A process in accordance with claim 7 wherein said polyhydroxy compound is said lignocellulose.

* * * * *

UNITED STATES PATENT AND TRADEMARK OFFICE
CERTIFICATE OF CORRECTION

PATENT NO. : 4,987,213
DATED : January 22, 1991
INVENTOR(S) : HIROSE et al

It is certified that error appears in the above-identified patent and that said Letters Patent is hereby corrected as shown below:

On the title page:

Under "Inventors:", "Kyoe Hatakeyama" should read --Hyoe Hatakeyama--.

Signed and Sealed this

Ninth Day of February, 1993

Attest:

STEPHEN G. KUNIN

*Attesting Officer*   Acting Commissioner of Patents and Trademarks